United States Patent
Sudo

(10) Patent No.: US 8,594,463 B2
(45) Date of Patent: Nov. 26, 2013

(54) METHOD AND APPARATUS FOR PROCESSING IMAGE OF MEDICAL MONITOR

(75) Inventor: Kenzo Sudo, San Jose, CA (US)

(73) Assignee: Advan Int'l Corp., Fremont, CA (US)

( * ) Notice: Subject to any disclaimer, the term of this patent is extended or adjusted under 35 U.S.C. 154(b) by 381 days.

(21) Appl. No.: 13/102,839

(22) Filed: May 6, 2011

(65) Prior Publication Data

US 2012/0281892 A1 Nov. 8, 2012

(51) Int. Cl.
*G06K 9/32* (2006.01)

(52) U.S. Cl.
USPC .......................... 382/298; 382/276; 382/305

(58) Field of Classification Search
USPC .............. 345/660, 665; 382/276, 298, 305; 715/800, 815
See application file for complete search history.

(56) References Cited

U.S. PATENT DOCUMENTS

| 6,933,977 | B2 * | 8/2005 | Egashira .................. 348/333.12 |
| 7,417,649 | B2 * | 8/2008 | Fleming et al. ............... 345/698 |
| 7,777,766 | B2 * | 8/2010 | Okumura et al. ............. 345/698 |
| 2008/0030614 | A1 * | 2/2008 | Schwab et al. ................ 348/441 |

* cited by examiner

*Primary Examiner* — Gregory F Cunningham

(57) ABSTRACT

Disclosed herein is a method of processing an image of a medical monitor. The method includes performing primary scaling of an image in longitudinal and transverse directions of a monitor panel according to a preset mode, when the image input to the monitor is a high definition (HD) image, determining a position of the image using a panel size of the monitor and an image size such that the image is displayed at a center of the panel, when the image is the HD image or a standard definition (SD) image, and loading preset information from an internal memory of the monitor to apply the preset information to the image. An apparatus for processing an image of a medical monitor is also disclosed herein.

19 Claims, 4 Drawing Sheets

METHOD AND APPARATUS FOR PROCESSING IMAGE OF MEDICAL MONITOR

BACKGROUND

1. Technical Field

Embodiments of the invention relate to a medical monitor and, more particularly, to a method and apparatus for processing an image of a medical monitor.

2. Description of the Related Art

With rapid development of computer and imaging techniques, various applications have emerged in the field of medical equipment. For example, diagnostic endoscopy, surgical endoscopy, robot surgical system, medical electron microscope, computer tomography (CT), magnetic resonance imaging (MRI), and the like have been developed and put to use.

When an image is taken by such a medical device, the image is sent to a medical monitor and displayed on a screen of the monitor. As a result, a surgeon can frequently watch images output on the screen of the monitor during an operation on a patient.

In a conventional medical monitor, however, image distortion occurs when expanding or reducing an input image in the horizontal or transverse direction to obtain optimal output of an image on the screen, so that the medical monitor provides an inaccurate image and cannot output an image of a surgical incision at the center of the screen, thereby making it difficult to perform an accurate operation.

BRIEF SUMMARY

One embodiment of the invention provides a method and apparatus for processing an image of a medical monitor, which can minimize image distortion upon enlargement/reduction in size of an image in horizontal/transverse directions to output the image on a display when the image is input to the medical monitor.

Another embodiment of the invention provides a method and apparatus for processing an image of a medical monitor, which allows an image of a surgical incision to be output at the center of a screen without image distortion by scaling the image according to a preset mode of an input image, so that a surgeon can perform an accurate operation while viewing the monitor.

The invention is not limited to the embodiments described above and additional features of the invention will become apparent to those skilled in the art from the following description.

In accordance with one embodiment of the invention, a method of processing an image of a medical monitor includes performing primary scaling of an image in longitudinal and transverse directions of a monitor panel according to a preset mode when the image input to the monitor is a high definition (HD) image; determining a position of the image using a panel size of the monitor and an image size such that the image is displayed at a center of the panel, when the image is the HD image or a standard definition (SD) image; and loading preset information from an internal memory of the monitor to apply the preset information to the image.

In accordance with another embodiment of the present invention, an apparatus for processing an image of a medical monitor includes a scaling unit that performs primary scaling of an image in longitudinal and transverse directions of a monitor panel according to a preset mode when the image input to the monitor is a high definition (HD) image; a positioning unit that determines a position of the image using a panel size of the monitor and an image size such that the image is displayed at a center of the panel when the image is the HD image or a standard definition (SD) image; and a preset information application unit that loads preset information from an internal memory of the monitor to apply the preset information to the image.

Other embodiments of the invention will be described in detail with reference to the following description and accompanying drawings.

According to the embodiments of the invention, the method and apparatus for processing an image of a medical monitor may minimize image distortion upon enlargement/reduction in size of an image in horizontal/transverse directions to output the image on a display when the image is input to the medical monitor.

According to the embodiments of the invention, the method and apparatus for processing an image of the medical monitor may permit an image of a surgical incision to be output at the center of a screen without distortion by scaling the image according to a preset mode of an input image, so that a surgeon can perform accurate operation while viewing the monitor.

BRIEF DESCRIPTION OF THE DRAWINGS

The above and other aspects, features, and advantages of the invention will become apparent from the detailed description of the following embodiments in conjunction with the accompanying drawings.

DETAILED DESCRIPTION

Figure 1:
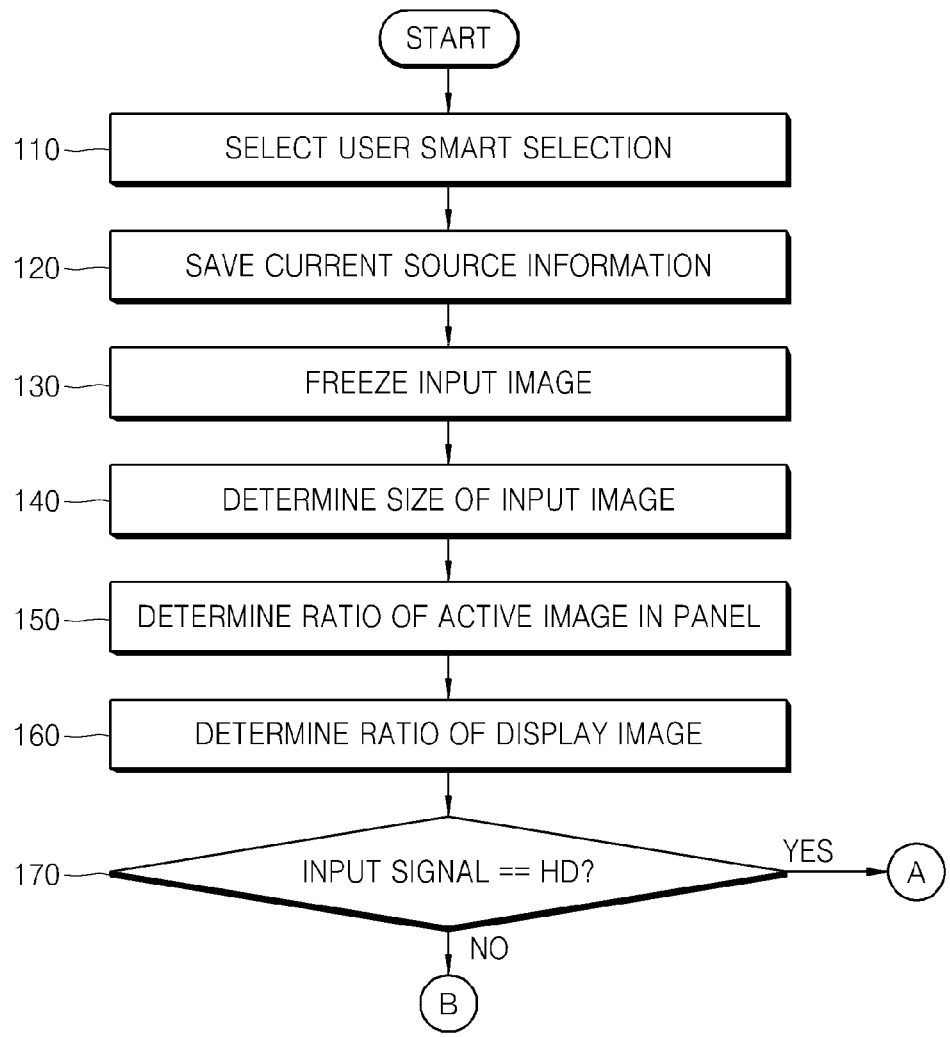
FIGS. 1 to 3 are flowcharts of a method of processing an image of a medical monitor according to an exemplary embodiment of the present invention.

Exemplary embodiments of the invention will now be described in detail with reference to the accompanying drawings. It should be understood that the present invention is not limited to the following embodiments and may be embodied in different ways, and that the embodiments are given to provide complete disclosure of the invention and to provide thorough understanding of the invention to those skilled in the art. The scope of the invention is limited only by the accompanying claims and equivalents thereof. Like components will be denoted by like reference numerals throughout the specification.

Prior to description of the embodiments of the invention, the meanings of the terms "One to One mode, "H-Fill mode", and "V-Fill mode" will be described.

Herein, the "One to One mode" means a mode for adjusting a scaling factor so as not to perform image scaling or to scale the image down to 0.9 times an original size thereof when positioning the image.

Herein, the "H-Fill mode" is an abbreviation for horizontal-fill mode and means a mode for adjusting the scaling factor to adjust the image in a longitudinal direction of a panel without image distortion when positioning the image.

Herein, the "V-Fill mode" is an abbreviation for vertical-Fill mode and means a mode for adjusting the scaling factor to adjust the image in a transverse direction of the panel without image distortion when positioning the image.

Figure 2:
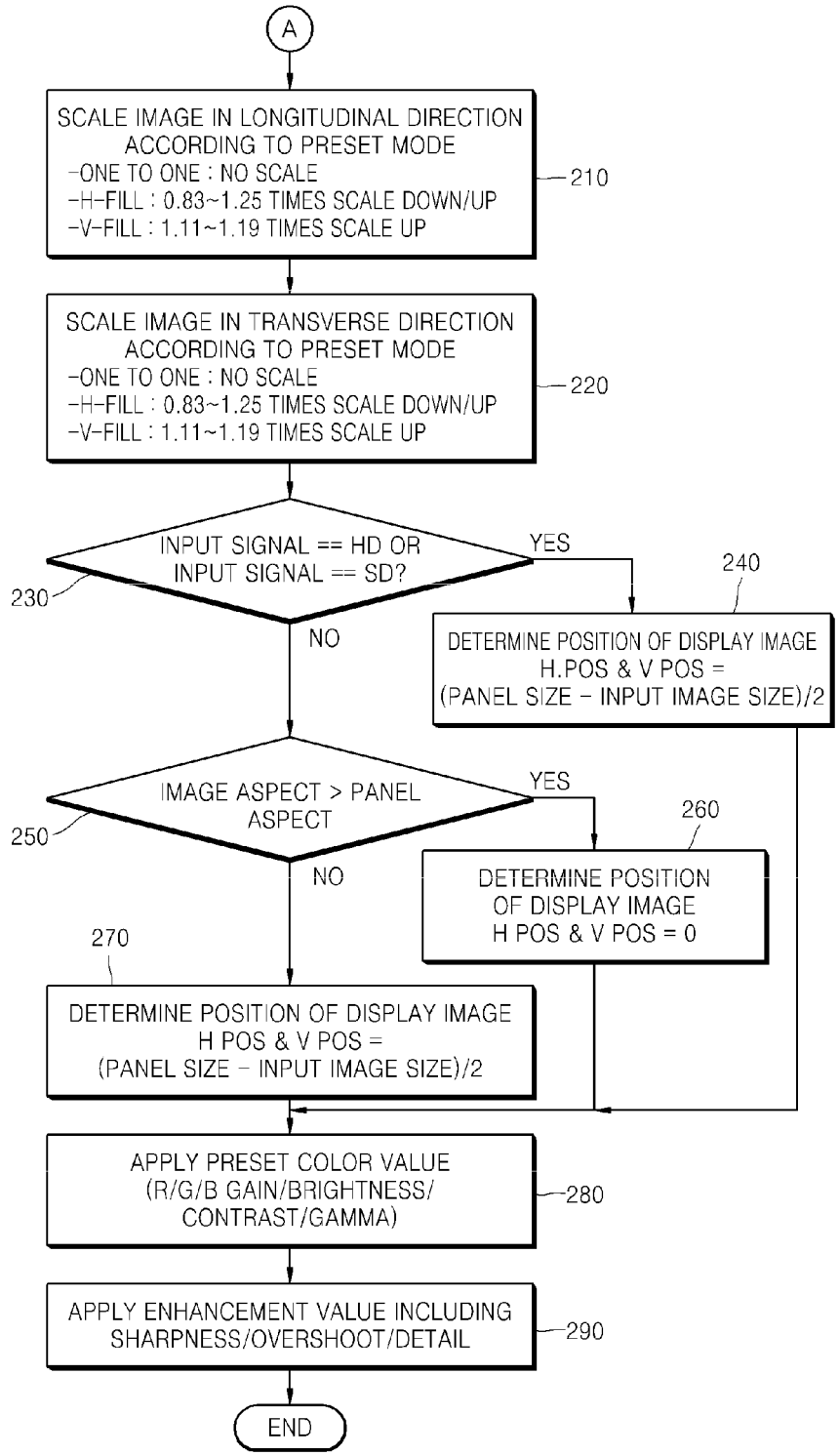
Figure 3:
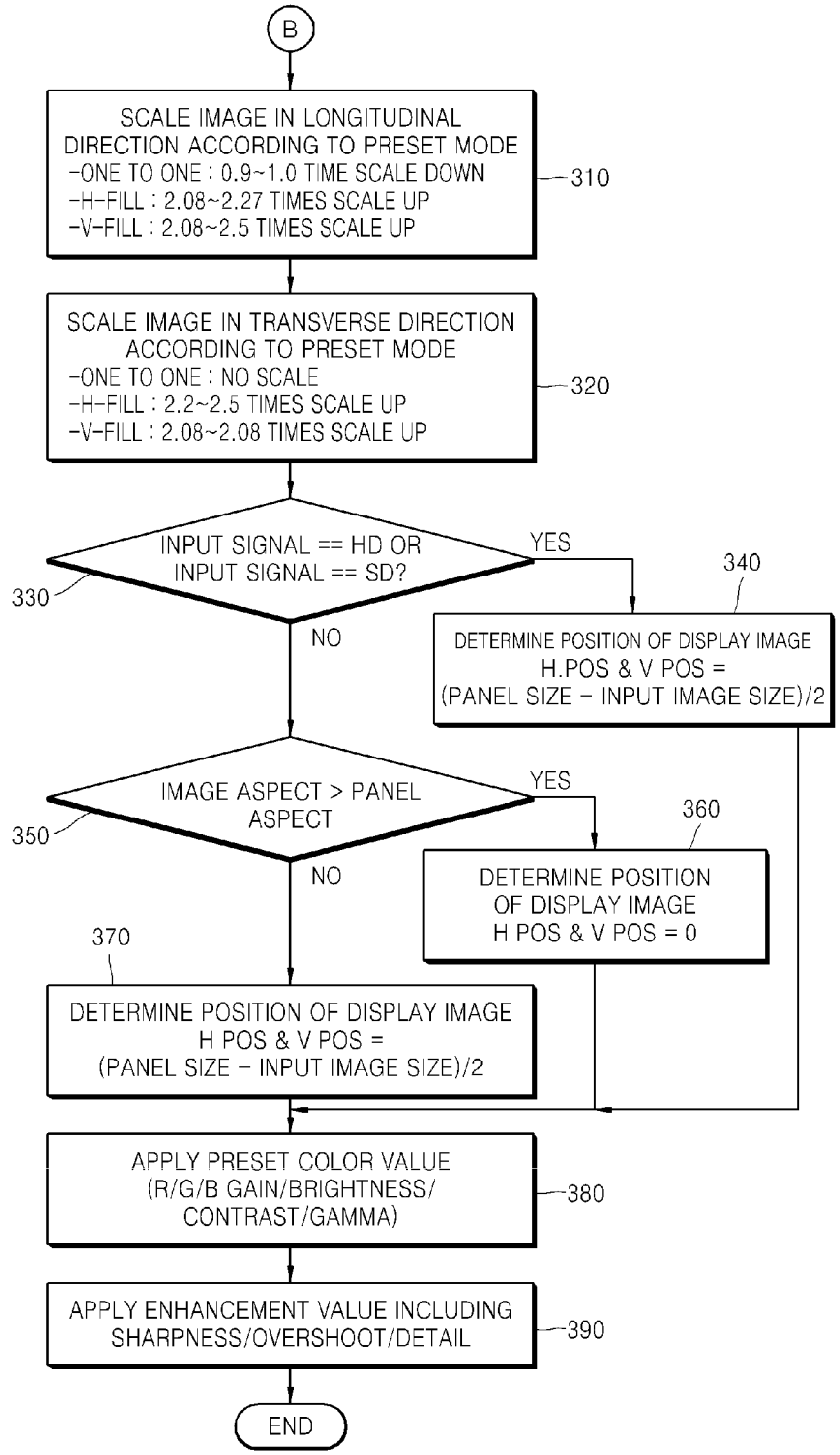

FIGS. 1 to 3 are flowcharts of a method of processing an image of a medical monitor according to an exemplary embodiment of the present invention. Here, the image processing method may be carried out by an image processing apparatus 400 of FIG. 4.

First, referring to FIG. 1, in operation 110, a user selects a smart selection menu among on-screen display (OSD) menus of a medical monitor.

Then, in operation 120, the image processing apparatus saves current source information. Specifically, the image processing apparatus stores source information regarding an interface between the monitor and a medical device, which supplies a video signal related to an image input to the monitor, in a memory mounted in the monitor.

Here, the source information may include DVI, HDMI, HD15, SD/HD-SDI 1, SD/HD-SDI 2, Component Y/G, Pb/B, Pr/R, H/CS, VS, S-Video, C-Video, and the like.

Next, in operation 130, the image processing apparatus freezes the input image. Specifically, the image processing apparatus captures a stationary image by temporarily stopping an image reproducing screen.

Next, in operation 140, the image processing apparatus determines the size of the input image. Specifically, the image processing apparatus determines horizontal and vertical sizes of the input image using the captured stationary image.

Next, in operation 150, the image processing apparatus determines the ratio of an active image in a panel of the monitor. Herein, the term "ratio of the active image" means a ratio of an area on which the image is substantially displayed on the panel of the monitor, that is, a screen ratio of the monitor panel.

Next, in operation 160, the image processing apparatus determines the ratio of a display image. Specifically, the image processing apparatus determines the ratio of the image displayed on the panel.

Next, in operation 170, the image processing apparatus determines whether an input signal of the image indicates high definition (HD) resolution. Here, the image processing apparatus may determine whether the input signal of the image indicates the HD image, based on resolution of the image according to the pixel of the image.

If it is determined that the input signal indicates the HD resolution, that is, if YES in operation 170, the image processing apparatus proceeds to a process shown in FIG. 2.

Referring to FIG. 2, in operation 210, the image processing apparatus scales the image in the longitudinal (horizontal) direction according to a preset mode. Specifically, the image processing apparatus scales the image in the longitudinal direction according to one of a "one to one" mode, an "H-Fill" mode, and a "V-Fill" mode (primary scaling).

For example, if the preset mode is the "H-Fill" mode, the image processing apparatus may scale the image down or up to 0.83~1.25 times the original size thereof in the longitudinal direction, and if the preset mode is the "V-Fill" mode, the image processing apparatus may scale the image up to 1.11~1.19 times the original size thereof in the longitudinal direction. On the contrary, if the preset mode is the "One to One" mode, the image processing apparatus may not perform scaling of the image.

Next, in operation 220, the image processing apparatus scales the image in the transverse (vertical) direction according to a preset mode. Specifically, the image processing apparatus scales the image in the transverse direction according to one of the "one to one" mode, the "H-Fill" mode, and the "V-Fill" mode (primary scaling).

For example, if the preset mode is the "H-Fill" mode, the image processing apparatus may scale the image down or up to 0.83~1.25 times the original size of the image in the transverse direction, and if the preset mode is the "V-Fill" mode, the image processing apparatus may scale the image up to 1.11~1.19 times the original size thereof in the transverse direction. On the contrary, if the preset mode is the "One to One" mode, the image processing apparatus may not perform scaling of the image.

Next, in operation 230, the image processing apparatus determines whether the input signal of the image indicates an HD or standard definition (SD) resolution.

For example, the image processing apparatus determines an input signal of 1080i and an input signal of 480i as HD and SD resolutions, respectively. Further, the image processing apparatus may determine other input signals such as 1280*960, 1280*1024, 1280*480, and the like as other resolutions than the HD and SD resolutions. For reference, in an input signal of 1080i, "1080" indicates 1080 lines of transverse (vertical) resolution and "i" indicates interlacing. Further, in an input signal of 480i, "480" indicates 480 lines of the transverse resolution and "i" indicates interlacing.

If it is determined that the input signal of the image indicates HD or SD resolution, that is, if YES in operation 230, the image processing apparatus determines positions of the image using the size of the panel and the size of the image such that the image can be displayed at the center of the panel (center of the screen), in operation 240. Here, the position of the image may correspond to a left upper side pixel of the image.

For example, if the input signal indicates the HD or SD resolution, the image processing apparatus may determine longitudinal and transverse positions of the image using a value obtained by dividing a difference in size between the panel and the image by 2, that is, (panel size−input image size)/2.

On the other hand, if it is determined that the input signal of the image indicates neither HD nor SD resolution, that is, if NO in operation 230, the image processing apparatus compares an aspect ratio of the image with an aspect ratio of the panel, in operation 250. That is, the image processing apparatus compares the ratio of longitudinal dimension to transverse dimension of the image with the ratio of longitudinal dimension to transverse dimension of the panel.

If the aspect ratio of the image is greater than that of the panel, that is, if YES in operation 250, the image processing apparatus determines the longitudinal and transverse positions of the image as "0" in operation 260.

On the other hand, if the aspect ratio of the image is less than or equal to that of the panel, that is, if NO in operation 250, the image processing apparatus determines the longitudinal and transverse positions of the image using the panel size and the image size in operation 270.

For example, if the aspect ratio of the image is less than or equal to that of the panel, the image processing apparatus may determine the longitudinal and transverse positions of the image using a value obtained by dividing a difference in size between the panel and the image by 2, that is, (panel size−input image size)/2.

Next, the image processing apparatus loads preset information from an internal memory of the monitor to apply the preset information to the image. Here, the preset information may be stored in the internal memory of the monitor and include preset color values such as R (Red)/G (Green)/B (Blue) gain, brightness, contrast and gamma, and enhancement values such as sharpness, overshoot, detail, and the like.

Specifically, in operation 280, the image processing apparatus may apply the preset color values such as R/G/B gain, brightness, contrast and gamma to the image.

Then, in operation 290, the image processing apparatus may apply the enhancement values such as sharpness, overshoot and detail to the image.

Next, the image processing apparatus may output the image to which the preset information is applied at the determined positions on the screen of the monitor. As a result, the image processing apparatus may display the image at the center of the monitor screen.

On the other hand, if it is determined that the input signal does not indicate HD resolution, that is, if NO in operation 170, the image processing apparatus proceeds to a process shown in FIG. 3.

Referring to FIG. 3, in operation 310, the image processing apparatus scales the image in the longitudinal (horizontal) direction according to a preset mode. Specifically, the image processing apparatus scales the image in the longitudinal direction according to one of the "one to one" mode, the "H-Fill" mode, and the "V-Fill" mode (secondary scaling).

For example, if the preset mode is the "H-Fill" mode, the image processing apparatus may scale the image up to 2.08~2.27 times the original size thereof in the longitudinal direction, and if the preset mode is the "V-Fill" mode, the image processing apparatus may scale the image up to 2.08~2.5 times the original size thereof in the longitudinal direction. On the contrary, if the preset mode is the "One to One" mode, the image processing apparatus may scale the image down to 0.9~1.0 times the original size thereof in the longitudinal direction.

Next, in operation 320, the image processing apparatus scales the image in the transverse direction according to a preset mode. Specifically, the image processing apparatus scales the image in the transverse (vertical) direction according to one of the "one to one" mode, the "H-Fill" mode, and the "V-Fill" mode (secondary scaling).

For example, if the preset mode is the "H-Fill" mode, the image processing apparatus may scale the image up to 2.2~2.5 times the original size of the image in the transverse direction, and if the preset mode is the "V-Fill" mode, the image processing apparatus may scale the image up to 2.08~2.8 times the original size thereof in the transverse direction. On the contrary, if the preset mode is the "One to One" mode, the image processing apparatus may not perform scaling of the image (no scale).

Next, in operation 330, the image processing apparatus determines whether the input signal of the image indicates HD or SD resolution.

For example, the image processing apparatus determines an input signal of 1080i and an input signal of 480i as HD and SD resolutions, respectively. Further, the image processing apparatus may determine other input signals such as 1280*960, 1280*1024, and 1280*480, as other resolutions than the HD and SD resolutions.

If it is determined that the input signal of the image indicates HD or SD resolution, that is, if YES in operation 330, the image processing apparatus determines positions of the image using the size of the panel and the size of the image such that the image can be displayed at the center of the panel (center of the screen), in operation 340.

For example, if the input signal indicates the HD or SD resolution, the image processing apparatus may determine longitudinal and transverse positions of the image using a value obtained by dividing a difference in size between the panel and the image by 2, that is, (panel size−input image size)/2.

On the other hand, if it is determined that the input signal of the image indicates neither HD nor SD resolution, that is, if NO in operation 330, the image processing apparatus compares the aspect ratio of the image with the aspect ratio of the panel, in operation 350. That is, the image processing apparatus compares the ratio of the longitudinal dimension to transverse dimension of the image with the ratio of the longitudinal dimension to transverse dimension of the panel.

If the aspect ratio of the image is greater than that of the panel, that is, if YES in operation 350, the image processing apparatus determines the longitudinal and transverse positions of the image as "0" in operation 360.

On the other hand, if the aspect ratio of the image is less than or equal to that of the panel, that is, if NO in operation 350, the image processing apparatus determines the longitudinal and transverse positions of the image using the panel size and the image size in operation 370.

For example, if the aspect ratio of the image is less than or equal to that of the panel, the image processing apparatus may determine the longitudinal and transverse positions of the image using values obtained by dividing differences in size between the panel and the image by 2, that is, (panel size−input image size)/2.

Next, the image processing apparatus loads preset information from the internal memory of the monitor to apply the preset information to the image. Here, the preset information may be stored in the internal memory of the monitor and include the preset color values such as R (Red)/G (Green)/B (Blue) gain, brightness, contrast and gamma, and the enhancement values such as sharpness, overshoot, detail, and the like.

Specifically, in operation 380, the image processing apparatus may apply the preset color values such as R/G/B gain, brightness, contrast and gamma to the image.

Then, in operation 390, the image processing apparatus may apply the enhancement values such as sharpness, overshoot and detail to the image.

Next, the image processing apparatus may output the image to which the preset information is applied at the determined positions on the screen of the monitor. As a result, the image processing apparatus may display the image at the center of the monitor screen.

Figure 4:
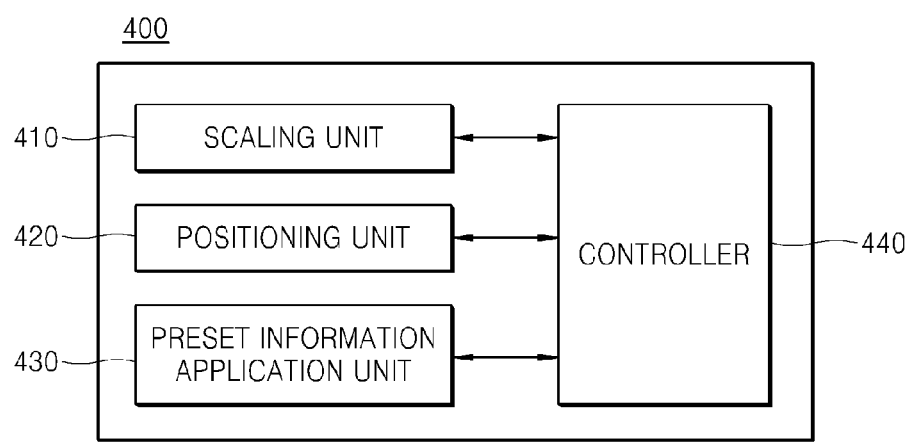
FIG. 4 is a block diagram of an apparatus for processing an image of a medical monitor according to an exemplary embodiment of the present invention.

FIG. 4 is a block diagram of an apparatus for processing an image of a medical monitor according to an exemplary embodiment of the present invention.

Referring to FIG. 4, an image processing apparatus 400 of a medical monitor according to the embodiment includes a scaling unit 410, a positioning unit 420, a preset information application unit 430, and a controller 440.

The scaling unit 410 performs primary scaling of an image in the longitudinal and transverse directions according to a preset mode, if the image input to the monitor is HD resolution.

For example, if the preset mode is the "H-Fill" mode, the scaling unit 410 may scale the image down or up to 0.83~1.25 times the original size thereof in the longitudinal and transverse directions, and if the preset mode is the "V-Fill" mode, the scaling unit 410 may scale the image up to 1.11~1.19 times the original size thereof in the longitudinal and transverse directions. On the contrary, if the preset mode is the "One to One" mode, the scaling unit 410 may not perform scaling of the image (no scale).

On the other hand, if the image input to the monitor is not HD resolution, the scaling unit 410 performs secondary scaling of the image in the longitudinal and transverse directions according to a preset mode.

For example, if the preset mode is the "H-Fill" mode, the scaling unit 410 may scale the image up to 2.08~2.27 times and 2.2~2.5 times the original size thereof in the longitudinal and transverse directions, respectively.

Further, if the preset mode is the "V-Fill" mode, the scaling unit 410 may scale the image up to 2.08~2.5 times and 2.08~2.8 times the original size thereof in the longitudinal and transverse directions, respectively.

Further, if the preset mode is the "One to One" mode, the scaling unit 410 may scale the image down to 0.9~1.0 time only in the longitudinal direction without scaling the image in the transverse direction.

The positioning unit 420 determines the positions of the image using the panel size and the image size such that the image can be displayed at the center of the panel, when the image subjected to the primary or secondary scaling is HD or SD resolution.

For example, the positioning unit 420 may determine the longitudinal and transverse positions of the image using a value obtained by dividing a difference in size between the panel and the image by 2, that is, (panel size−input image size)/2, if the image is HD or SD resolution.

In detail, if the image is the HD or SD resolution, the positioning unit 420 may determine the longitudinal position of the image using a value obtained by dividing a difference between the longitudinal size of the panel and the longitudinal size of the image by 2 and the transverse position of the image using a value obtained by dividing a difference between the transverse size of the panel and the transverse size of the image by 2.

On the contrary, if the image has neither HD nor SD resolution, the positioning unit 420 compares the aspect ratio of the image with that of the panel. That is, the positioning unit 420 compares the ratio of longitudinal dimension to transverse dimension of the image with the ratio of longitudinal dimension to transverse dimension of the panel If the aspect ratio of the image is greater than that of the panel, the positioning unit 420 determines the longitudinal and transverse positions of the image as "0".

If the aspect ratio of the image is less than or equal to that of the panel, the positioning unit 420 determines the longitudinal and transverse positions of the image using the panel size and the image size.

For example, if the aspect ratio of the image is less than or equal to that of the panel, the positioning unit 420 may determine the longitudinal and transverse positions of the image using values obtained by dividing differences in size between the panel and the image by 2, that is, (panel size−input image size)/2

The preset information application unit 430 loads preset information from the internal memory of the monitor to apply the preset information to the image. Specifically, the preset information application unit 430 may apply preset color values, such as R (Red)/G (Green)/B (Blue) gain, brightness, contrast and gamma, and enhancement values, such as sharpness, overshoot and detail, to the image.

As a result, the image processing apparatus 400 may output the image to which the preset information is applied at the determined positions on the screen of the monitor. Accordingly, the image processing apparatus 400 may display the image at the center of the monitor screen.

The controller 440 generally controls operation of the image processing apparatus 400 of the medical monitor according to the embodiment, that is, the scaling unit 410, the positioning unit 420, and the preset information application unit 430.

As such, the method and apparatus according to the embodiment may minimize image distortion upon enlargement/reduction in size of an image in horizontal/transverse directions to output the image on a display when the image is input to the medical monitor.

Further, the image processing method and apparatus according to the embodiment may permit an image to be output at the center of a screen without image distortion by scaling the image according to a preset mode of an input image.

Therefore, the image processing method and apparatus according to the embodiment may permit an image of a surgical incision to be output at the center of the screen without image distortion, so that a surgeon can perform an accurate operation while viewing an output screen of the monitor.

Embodiments of the present invention may be realized in the form of program instructions which can be implemented through various computer components, and may be recorded in a computer-readable recording medium. The computer-readable recording medium may include a program instruction, a local data file, a local data structure, and the like either alone or in combination thereof. The computer-readable recording medium may be any medium particularly designed and structured for the present invention or known to those skilled in the field of computer software. Examples of the computer-readable recording medium include magnetic recording media such as hard disks, floppy disks and magnetic tapes, optical data storage media such as CD-ROMs or DVD-ROMs, magneto-optical media such as floptical disks, and hardware devices, such as read-only memory (ROM), random-access memory (RAM), and flash memory, which are particularly structured to store and implement the program instruction. Examples of the program instruction include not only a mechanical language code generated by a compiler but also a high level language code which can be implemented by a computer using an interpreter. The hardware devices may be configured to be operated by one or more software modules or vice versa to perform the processes according to the invention.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

What is claimed is:

1. A method of processing an image of a medical monitor comprising:
    performing primary scaling of an image in longitudinal and transverse directions of a monitor panel according to a preset mode when the image input to the monitor is a high definition (HD) image;
    determining a position of the image using a panel size of the monitor and an image size such that the image is displayed at a center of the panel, when the image is the HD image or a standard definition (SD) image; and
    loading preset information from an internal memory of the monitor to apply the preset information to the image,
    the position of the image corresponding to a left upper side pixel of the image.

2. The method of claim 1, wherein the primary scaling of the image comprises scaling the image down or up to 0.83~1.25 times an original size of the image in the longitudinal and transverse directions when the preset mode is an "H-Fill" mode.

3. The method of claim 1, wherein the performing primary scaling of the image comprises scaling the image up to 1.11~1.19 times an original size of the image in the longitudinal and transverse directions when the preset mode is a "V-Fill" mode.

4. The method of claim 1, wherein the primary scaling of the image is not carried out in the longitudinal and transverse directions when the preset mode is a "One-to-One" mode.

5. The method of claim 1, further comprising:
comparing an aspect ratio of the image with an aspect ratio of the panel when the image is neither the HD image nor the SD image; and
determining the position of the image using the panel size and the image size if the aspect ratio of the image is less than or equal to the aspect ratio of the panel.

6. The method of claim 1, wherein the determining the position of the image comprises determining the position of the image using a value obtained by dividing a difference in size between the panel size and the image size by 2.

7. The method of claim 5, further comprising:
determining longitudinal and transverse positions of the image as zero if the aspect ratio of the image is greater than that of the panel.

8. The method of claim 1, further comprising:
performing secondary scaling of the image in the longitudinal and transverse directions according to the preset mode when the image input to the monitor is not the HD image.

9. The method of claim 8, wherein the performing secondary scaling of the image comprises scaling the image up to 2.08~2.27 times and 2.2~2.5 times an original size of the image in the longitudinal and transverse directions, respectively, when the preset mode is an "H-Fill" mode.

10. The method of claim 8, wherein the secondary scaling of the image comprises scaling the image up to 2.08~2.5 times and 2.08~2.8 times an original size of the image in the longitudinal and transverse directions, respectively, when the preset mode is a "V-Fill" mode.

11. The method of claim 8, wherein the performing secondary scaling of the image comprises scaling the image down to 0.9~1.0 times an original size of the image in the longitudinal direction when the preset mode is a "One-to-One" mode.

12. An apparatus for processing an image of a medical monitor comprising:
a scaling unit that performs primary scaling of an image in longitudinal and transverse directions of a monitor panel according to a preset mode when the image input to the monitor is a high definition (HD) image;
a positioning unit that determines a position of the image using a panel size of the monitor and an image size such that the image is displayed at a center of the panel when the image is the HD image or a standard definition (SD) image; and
a preset information application unit that loads preset information from an internal memory of the monitor to apply the preset information to the image,
the position of the image corresponding to a left upper side pixel of the image.

13. The apparatus of claim 12, wherein the scaling unit scales the image down or up to 0.83~1.25 times an original size of the image in the longitudinal and transverse directions when the preset mode is an "H-Fill" mode.

14. The apparatus of claim 12, wherein the scaling unit scales the image up to 1.11~1.19 times an original size of the image in the longitudinal and transverse directions when the preset mode is a "V-Fill" mode.

15. The apparatus of claim 12, wherein, when the image is neither the HD image nor the SD image, the positioning unit compares an aspect ratio of the image with an aspect ratio of the panel, and determines the position of the image using the panel size and the image size if the aspect ratio of the image is less than or equal to that of the panel.

16. The apparatus of claim 12, wherein the positioning unit determines the position of the image using a value obtained by dividing a difference in size between the panel size and the image size by 2.

17. The apparatus of claim 12, wherein the scaling unit scales the image up to 2.08~2.27 times and 2.2~2.5 times an original size of the image in the longitudinal and transverse directions, respectively, when the image is not the HD image and the preset mode is an "H-Fill" mode.

18. The apparatus of claim 12, wherein the scaling unit scales the image up to 2.08~2.5 times and 2.08~2.8 times an original size of the image in the longitudinal and transverse directions, respectively, when the image is not the HD image and the preset mode is a "V-Fill" mode.

19. The method of claim 12, wherein the scaling unit scales down the image to 0.9~1.0 time an original size of the image in the longitudinal direction, when the image is not the HD image and the preset mode is a "One-to-One" mode.

* * * * *